R. R. R. STEWART.
Whiffletrees and Traces.

No, 134,227.　　　　　　　　　　　Patented Dec. 24, 1872.

Witnesses:　　　　　　　　　　　Inventor:
A. Benneixendorf.　　　　　　　　R. R. R. Stewart
C. Sedgwick　　　　　　　　　　per
　　　　　　　　　　　　　　　　Attorneys.

UNITED STATES PATENT OFFICE.

ROBERT R. R. STEWART, OF RIVER VALE, INDIANA.

IMPROVEMENT IN WHIFFLETREES AND TRACES.

Specification forming part of Letters Patent No. 134,227, dated December 24, 1872.

*To all whom it may concern:*

Figure 1:
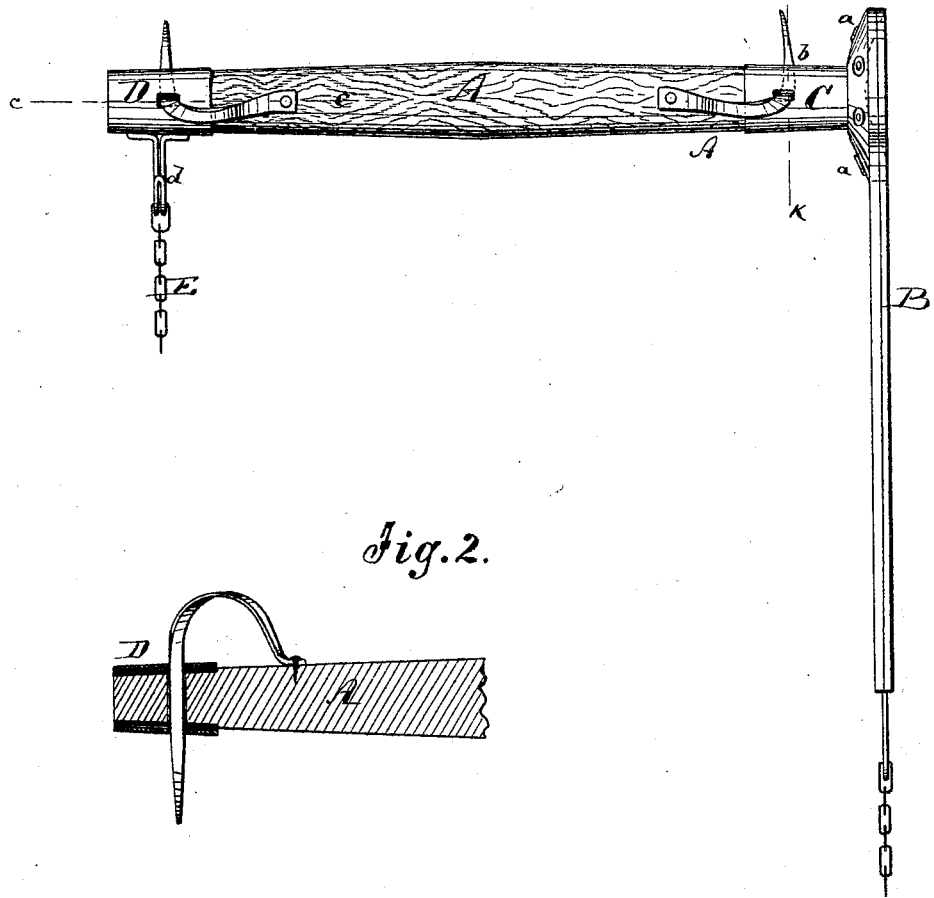
Figure 2:
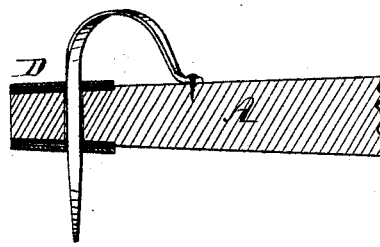
Figure 3:
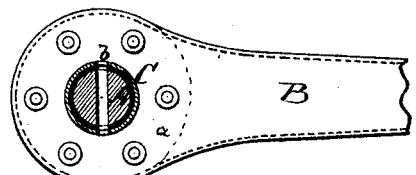

Be it known that I, ROBERT R. R. STEWART, of River Vale, in the county of Lawrence and State of Indiana, have invented a new and Improved Single-Tree and Trace, of which the following is a specification:

Figure 1 represents a top view of my invention. Fig. 2 is a detail longitudinal section on the line $c\ c$, Fig. 1. Fig. 3 is a transverse section on the line $k\ k$, Fig. 1.

Similar letters of reference indicate corresponding parts.

This invention has for its object to avoid injury to field-plants by the projecting ends of single-trees or whiffletrees of agricultural machines. The invention consists in so constructing the whiffletrees or single-trees that the traces when attached thereto will be flush with their ends. At present many plants are injured by the projecting ends of the whiffletrees of cultivators or other agricultural machines, and large sums of money in consequence annually lost to the country.

In the drawing, the letter A represents a single or whiffletree of suitable size held in place on the machine by suitable means. B is the trace attached to one end of the tree A. To the end of the trace is riveted the flange $a$ of a short tube, C, the flange being concave or straight, as may be desired—concave when the rivet-heads project from its outer face. The trace is attached to the tree A by slipping the tube C over the latter, and then fastening the tube by a suitable key, $b$, as shown. This trace-connection need only be at that end of the whiffletree which will sweep past the rows of plants. It will leave the trace flush with the end of the tree and leave no projection on the latter to tear down or injure the plants. For double teams the two outer ends of the whiffletree may be thus protected by the traces, while the inner ends may have suitable other fastenings for single teams, but that end may be so protected which will pass near the plants. The other end may have a suitable trace-connection.

The drawing represents a tube, D, as applied to the other end of the tree A, said tube having a projecting hook, $d$, to which the chain-trace E is secured. By having the tube E the single-tree is prepared for either kind of fastening at either end, and the leather trace need only be used on one side, the other side having the more economical chain E.

Having thus described my invention, I claim as new and desire to secure by Letters Patent—

The tube C having flange $a$ concave on outer face, and receiving a leather trace, B, as and for purpose described.

ROBERT R. R. STEWART.

Witnesses:
JAMES T. ANDREWS,
CHAS. R. DURMENT.